United States Patent [19]
Schneider et al.

[11] Patent Number: 5,501,193
[45] Date of Patent: Mar. 26, 1996

[54] METHOD FOR THE RECOGNITION OF IDLING IN CONNECTION WITH A LOAD-SHIFTING DEVICE OF AN INTERNAL COMBUSTION ENGINE CONTROLLED BY THROTTLE VALVE

[75] Inventors: Erwin Schneider, Liederbach; Frank Göhring, Frankfurt, both of Germany

[73] Assignee: VDO Adolf Schindling AG, Frankfurt, Germany

[21] Appl. No.: 324,248

[22] Filed: Oct. 14, 1994

[30] Foreign Application Priority Data

Nov. 26, 1993 [DE] Germany .................. 43 40 372.7

[51] Int. Cl.⁶ .................. F02D 9/02; F02D 41/08
[52] U.S. Cl. .................. 123/339.14; 73/118.1; 123/399
[58] Field of Search .......... 123/339.14, 339.15, 123/361, 399, 479, 494; 73/118.1

[56] References Cited

U.S. PATENT DOCUMENTS

| | | | |
|---|---|---|---|
| 4,722,313 | 2/1988 | Kohler et al. | 123/494 |
| 4,920,939 | 5/1990 | Gale | 123/479 X |
| 5,065,721 | 11/1991 | Wiggins et al. | 123/479 X |
| 5,213,078 | 5/1993 | Kolberg et al. | 123/399 |
| 5,321,980 | 6/1994 | Hering et al. | 73/188.1 |

FOREIGN PATENT DOCUMENTS 4000125 7/1991 Germany.

*Primary Examiner*—Tony M. Argenbright
*Attorney, Agent, or Firm*—Martin A. Farber

[57] ABSTRACT

A method for recognizing idling in a load-shifting device of an internal combustion engine controlled by throttle valve, in which the position of a setting element on the throttle-valve side is monitored by a first potentiometer and the position of a setting element on the setting-drive side is monitored by a second potentiometer. In order to be able to dispense with a separate idle contact associated with the setting element on the accelerator-pedal side for detecting the driver's wish for "idling", use is made of potentiometers having linear characteristic curves, and comparing the ratio of the characteristic curves with the actual characteristic curve ratio resulting in operation for differences. A second solution proposes adjusting the two potentiometers to the same slope by balancing at two points each, continuously detecting the voltage shifts of the two potentiometers and recognizing idling if, with a given voltage shift of the one potentiometer, a voltage shift which is predetermined on basis of the microlinearity properties of the potentiometers occurs on the other potentiometer.

7 Claims, 3 Drawing Sheets

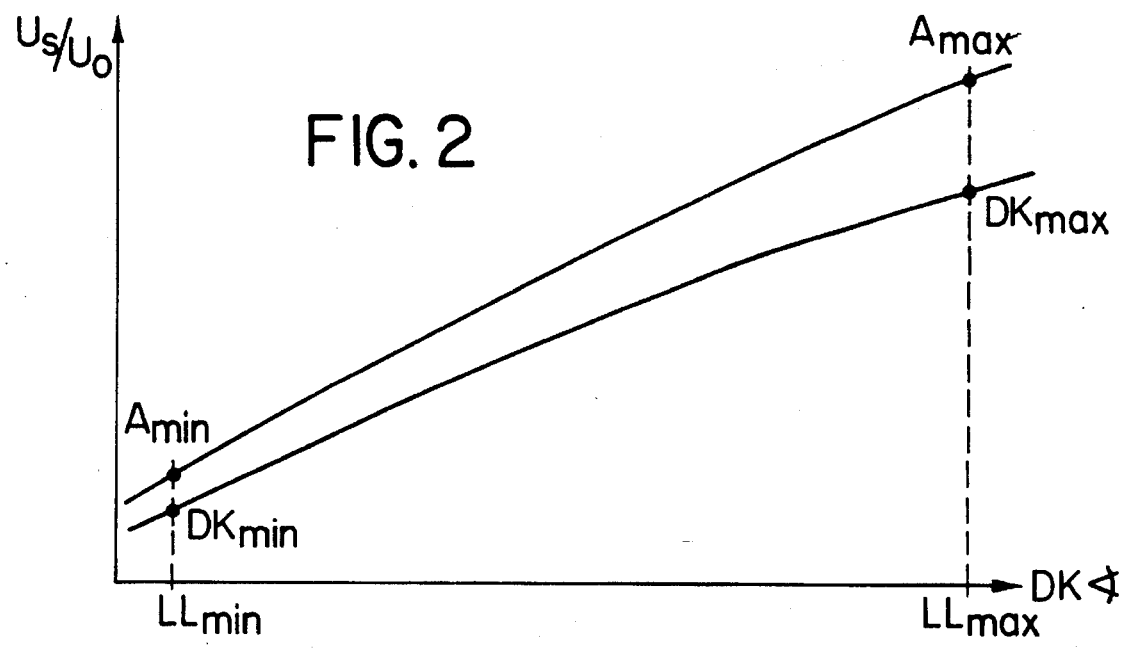
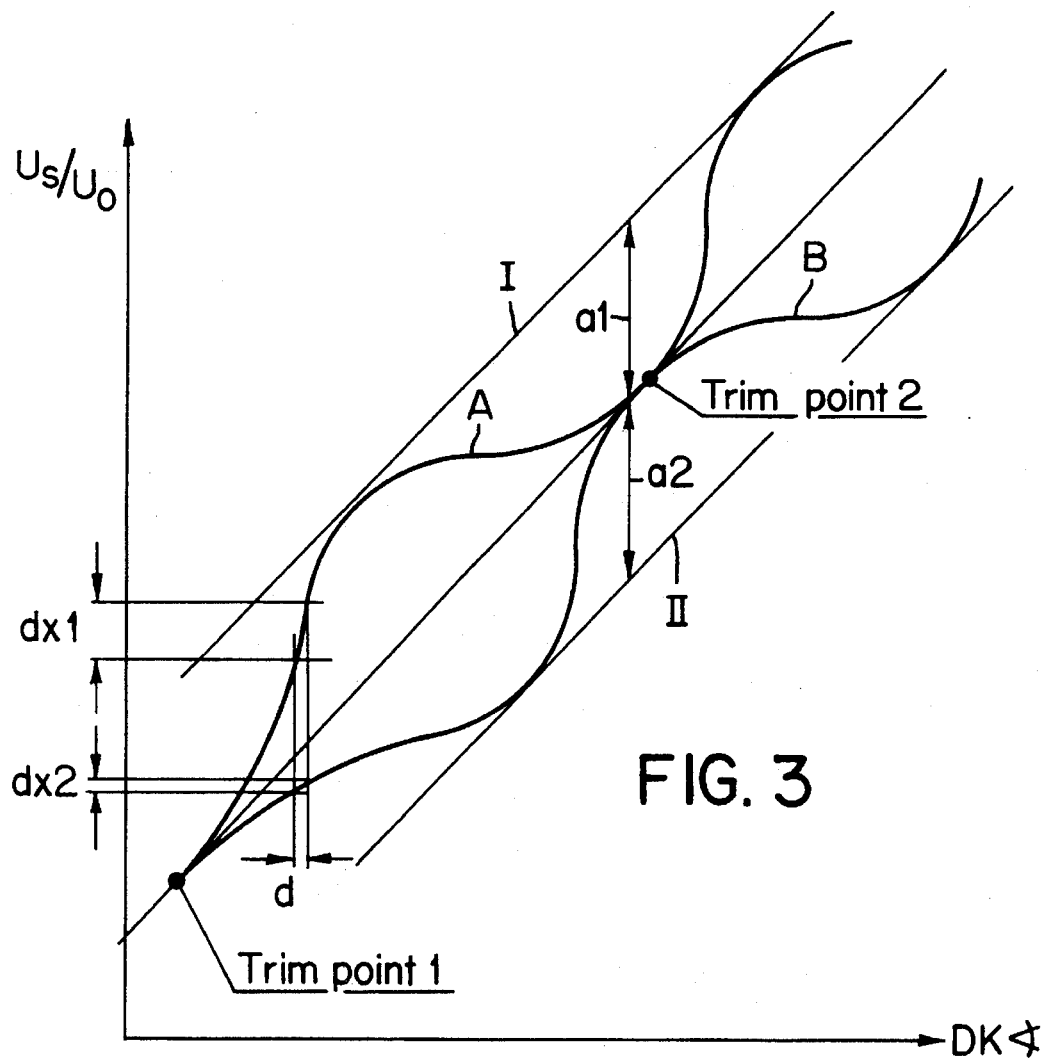

1

METHOD FOR THE RECOGNITION OF IDLING IN CONNECTION WITH A LOAD-SHIFTING DEVICE OF AN INTERNAL COMBUSTION ENGINE CONTROLLED BY THROTTLE VALVE

FIELD AND BACKGROUND OF THE INVENTION

The invention relates to a method for the recognition of idling in connection with a load-shifting device of an internal combustion engine controlled by a throttle valve in which the position of a setting element on the throttle-valve side is monitored by a first potentiometer and the position of a setting element on the setting-drive side is monitored by a second potentiometer.

In a prior art load-shifting device (German 40 00 125) which serves the purpose of controlling the throttle valve when idling by an electromotive setting drive independent of the accelerator pedal and/or making speed control possible in the partial-load/full-load region of the internal combustion engine, the following signals are to be detected in order to effect the control:

1. Recognition of the driver's wish for "idling";
2. Low actual value of the electromotive setting drive for the position control circuit;
3. The position of the throttle valve for the injection electronics.

Up to now, these functions have been carried out by an idle contact on a setting element on the accelerator-pedal side which is formed as a pulley, as well as by a first potentiometer on the drive shaft of the electromotive setting drive and a second potentiometer on the setting element on the throttle-valve side which is developed as throttle valve shaft. The wiper paths of the two potentiometers are present on a common support plate which is firmly attached to the housing of the throttle valve. The wipers are moved relative to the wiper paths by the electromotive setting drive or the throttle valve.

SUMMARY OF THE INVENTION

It is an object of the present invention to provide a method for the recognition of idling in connection with the load-shifting device described which method can recognize the driver's wish for "idling" without a separate idle contact, whereby manufacturing costs can be saved by elimination of the contact and of lines.

According to a first aspect of the invention, in the case of the two potentiometers (13, 18) which have linear characteristic curves, the fixed predetermined ratio between the characteristic curves is determined, the actual ratio of the characteristic curves resulting in operation is detected, the actual characteristic curve-ratio detected is compared with the fixed predetermined ratio for agreement, and, in the event of agreement between the actual ratio of the characteristic curves detected and the fixed predetermined ratio, an idling signal is produced and, in case an idling signal is present, the electromotive setting drive (12) is controlled by an electronic system (3).

The invention is based on the discovery that no further measures are necessary in order to recognize the desire for idling if it is possible to bring the characteristic curves of the wipers into coincidence. In the case of potentiometers which can be manufactured at reasonable expense, the characteristic curves of the wipers, however, do not coincide. If it is assumed that the two characteristic curves are linear, one can, for instance, determine differences in slope and offset of the characteristic curves as a basis for their comparison. This is done, for instance, by detecting the wiper voltages of the wipers for the electromotive setting drive and the throttle valve at the throttle valve angles $LL_{min}$ and $LL_{max}$ (i.e minimum idle and maximum idle). In this way, a fixed predetermined ratio between the characteristic curves is known. If the voltage values differ from this ratio, the driver has actuated the accelerator pedal. The basic adaptation of these values can be effected, for instance, at the end of the assembly line upon the manufacture of the car in the manner that with the accelerator pedal (2) unactuated, the setting element (11) which is drivable by electric motor is positioned in $LL_{min}$ and $LL_{max}$ positions, and the limit values ($A_{min}$, $DK_{min}$; $A_{max}$, $DK_{max}$) of the characteristic curves determined in these positions are stored in a nonvolatile storage of a controller.

In order to be able to take drift of the potentiometer characteristic curves over its life into account, the adaption process can furthermore be repeated upon each start of the vehicle. In the case of corresponding deviations, the limit points stored must then be corrected. This should only take place when it is made certain that the accelerator pedal is not actuated during the adaptation process. Whether the accelerator pedal is actuated can be noted from the variation of the voltage of the wiper for the setting element on the throttle-valve side. If the accelerator pedal is actuated, this voltage will not change over a partial region of the angle between $LL_{min}$ and $LL_{max}$ if the accelerator pedal is actuated only slightly, or the voltage will lie above the stored wiper value of the throttle valve in the throttle valve position $LL_{max}$ and not change over the entire region between $LL_{min}$ and $LL_{max}$.

The particularly simple solution described has certain inaccuracies for the reason, in particular, that the characteristic curves, even if they are referred to as linear, show a certain deviation from linearity. A second, more costly solution which leads to more accurate results provides that, in a load-shifting device of the type described, both potentiometers (13, 18) are set at two points each at the same slope. The voltage shifts of the two potentiometers (13, 18), upon a change in the throttle valve position, are detected and idling is recognized if, with a given voltage shift of the one potentiometer (18), a voltage shift determined on basis of the microlinearity properties of the potentiometers is present on the other potentiometer (13).

A prerequisite for this method is thus that both potentiometers be balanced to the same slope at two points each. This can be effected by mechanical balancing of the resistors by means of laser or by software corrections by means of a microprocessor.

If the absolute values of the wiper voltages of the two potentiometers are compared with each other, a lifting of the throttle-valve side setting element from the setting-drive-side setting element can be dependably noted only when the difference between the two wiper voltages is greater than the sum of the two maximum possible deviations from the ideal straight lines determined by the balancing points. This possibility can serve only as a rough orientation, since a relatively large switch hysteresis results therefrom.

However, if the gradients of the courses of the two wiper voltages are evaluated, the switch hysteresis can be reduced to a minimum down to the limit resolution of the measurement circuit. If, with the accelerator pedal unactuated, a specific voltage shift is experienced, for example, by the wiper of one potentiometer then there can only occur, on the wiper of the other potentiometer, a voltage shift which is as large as previously established on basis of the microlinearity properties of the potentiometers. If this voltage shift is greater or smaller, idling is not present.

An erroneous recognition of idling, which can only occur when the throttle-valve side setting element is moved by actuation via the accelerator pedal at a slight distance parallel to the setting-drive-side setting element, corrects itself. Thus, the speed of rotation of the internal combustion engine is, in this case, above the desired idling speed of rotation. If idling is recognized, an idle controller will counteract it and move the electromotive setting drive in closing direction. The throttle-valve side setting element which is held fast via the accelerator pedal cannot follow the setting-drive setting element, this being immediately recognized by the gradient comparison.

BRIEF DESCRIPTION OF THE DRAWINGS

With the above and other objects and advantages in view, the present invention will become more clearly understood in connection with the detailed description of preferred embodiments, when considered with the accompanying drawings, of which:

FIG. 2 shows, in a graph for the first inventive aspect, the dependence of the standardized wiper voltage as a function of the throttle valve angle for both potentiometers;

FIG. 3 is a showing corresponding to FIG. 2, for the second aspect of the invention, but only for a partial region of the idling range.

DETAILED DESCRIPTION OF THE PREFERRED EMBODIMENTS

Figure 1:
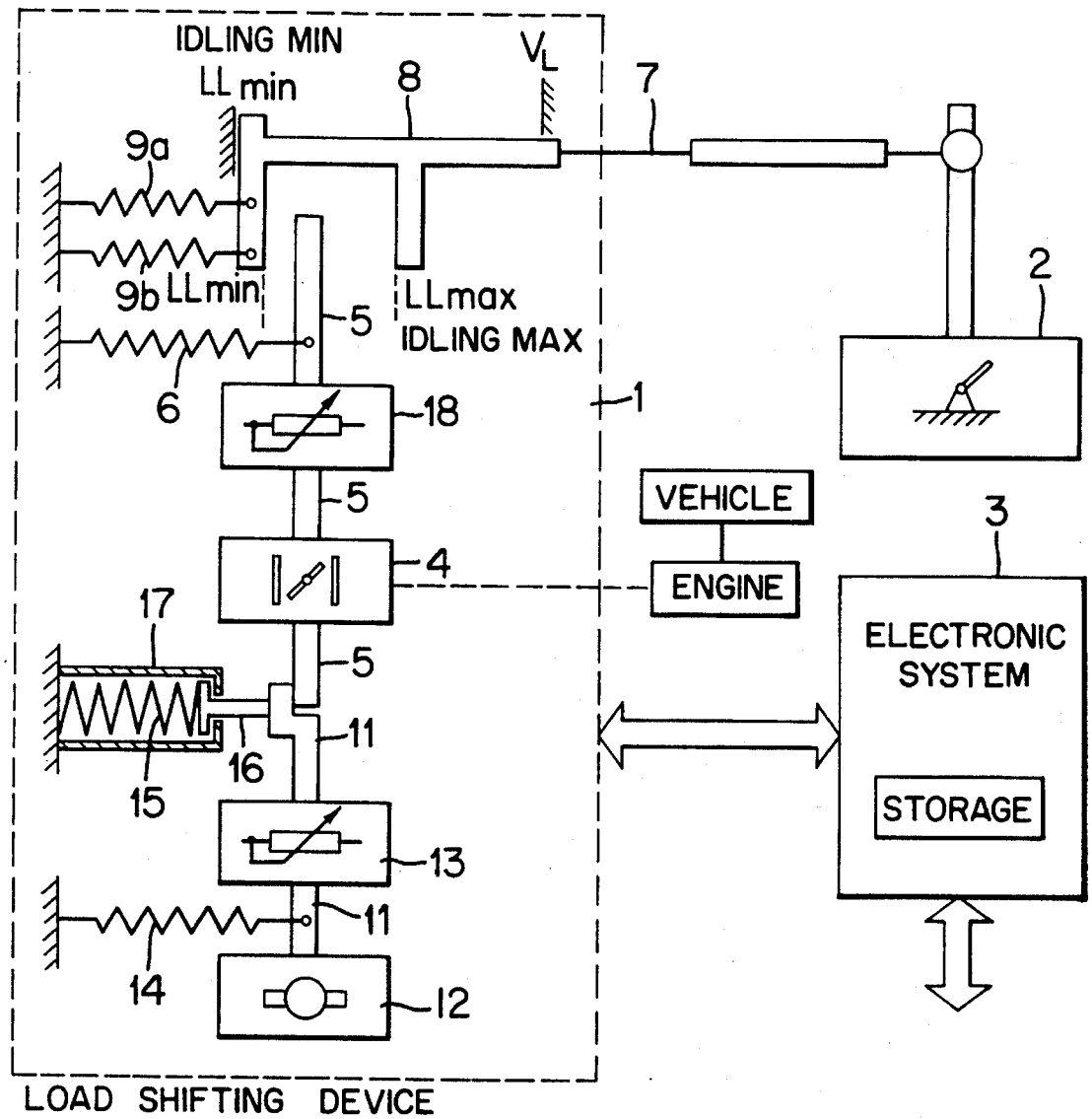
FIG. 1 is a block diagram showing the basic manner of operation of the load-shifting device.

FIG. 1 refers to the case of the electromotive control of the throttle valve in the idling range of the internal combustion engine. In this figure, 1 is a load-shifting device which can be controlled externally via an accelerator pedal 2 and an electronic system 3. The load-shifting device 1 contains a throttle valve 4, which is displaceable via a setting element 5 on the throttle-valve side. A tension spring 6 is attached to the throttle-valve-side setting element 5 and to a stationary structural part of the load-shifting device 1, and urges the setting element 5 on the throttle-valve side in the idling direction. The throttle valve 4 can be controlled by electric motor 12 between a minimum idling position $LL_{min}$ and a maximum idling position $LL_{max}$.

The accelerator pedal 2 cooperates, via a Bowden cable 7, with a setting element 8 on the accelerator-pedal side, which element is movable by the accelerator pedal 2 between an $LL_{min}$ and a VL (full load) stop. Two tension springs 9a and 9b are attached to the setting element 8 on the accelerator-pedal side, and to a stationary structural part of the load-shifting device 1, and urge the setting element 8 on the accelerator-pedal side in idling direction against the $LL_{min}$ stop. The springs 9a and 9b are so designed that they have redundant effects on the reset drive and each one of them is able to provide the forces for bringing the setting element 8, which is on the accelerator-pedal side, into its LL (idle) position even when taking into account the imminent forces on this acting system.

The setting element 8 on the accelerator-pedal side extends, in the control direction, into the path of movement of the setting element 5 on the side of the throttle valve. Independently of this, a setting element 11 on the setting-drive side engages in the upward control direction into the path of movement of the setting element 5 on the throttle-valve side. The setting element 11 on the setting-drive side is movable within the idling range by means of the electromotive setting drive 12. A tension spring 14 is attached to the setting element 11 on the setting-drive side and to a stationary structural part of the load-shifting device 1, and urges the setting element 11 on the setting-drive side in the downward control direction. An emergency spring 15 acts against the force of the spring 14 via a ram 16 on the setting element 11, the displacement path of the spring 15 being limited in the $LL_{not}$ (emergency idle) direction by a stationary sleeve 17.

The load-shifting device described up to now is controlled in the idling-control range via the electromotive setting drive 12 and in the partial-load range, as well as the full-load range, via the accelerator pedal 2. In idling operation—with the accelerator pedal 2 unactuated—the setting element 8 on the accelerator-pedal side assumes the stop position $LL_{min}$ shown in the drawing, while the throttle valve 4, as a function of the control via the electromotive setting drive 12, which, in its turn, is controlled by the electronic system 3, is in a operating point which lies, in the example in FIG. 1, approximately in the center between the operating positions $LL_{min}$ and $LL_{max}$. This operating point can of course vary; it depends on the loads (for instance, rear window heating, air conditioner) which must be supplied by the internal combustion engine and thus cause a given, variable idling speed of rotation of the internal combustion engine.

The position of the setting element 11 on the setting-drive side is monitored by a potentiometer 13 associated with it. The monitoring of the position of the setting element 5 on the throttle-valve side is effected by potentiometer 18 associated with it.

Instead of the associating of an idle contact with the setting element 8 on the accelerator-pedal side in order, in this way, to be able to represent the driver's wish for "idling", the recognition of the driver's wish for "idling" is effected, in accordance with the invention, by the balancing of the two potentiometers 13 and 18.

The graph of FIG. 2 shows, for the first solution described, the standardized wiper voltages $U_s/U_o$ as a function of the angle of the throttle valve. The upper curve is that of the wiper of the potentiometer 13 monitoring the setting element 11 on the setting drive side, while the lower curve is that of the wiper of the potentiometer 18 monitoring the setting element 5 on the throttle valve side. The potentiometers have characteristics such that their characteristic curves shown are linear, although, to be sure, they do not coincide. By determination of the points $A_{min}$ and $A_{max}$ as well as $DK_{min}$ and $DK_{max}$ at the operating points $LL_{min}$ and $LL_{max}$, respectively, difference in slope and offset of the two characteristic curves can be determined. In this way, a fixed, predetermined ratio between the characteristic curves is known. If this ratio of the characteristic curves is satisfied upon the operation of the internal combustion engine, this is recognized to be in line with the driver's wish for "idling"; if the voltage values differ from the ratio, the driver has actuated the accelerator pedal 2. The basic adaptation of these values is effected advisedly at the time of the manufacture of the vehicle; the adaptation procedure can, for instance, be repeated upon each start of the vehicle and be stored in a non-volatile storage of the electronic system 3.

FIG. 3 shows the more precise evaluation of the potentiometer characteristic curves, again shown as the standardized wiper voltages $U_s/U_o$ plotted against the throttle valve angle, although, for non-linear characteristic curves, as is expressed by the second solution in accordance with the invention. In this figure:

A are the characteristic curves of the potentiometer 13 associated with the drive;

b is the characteristic curve of the potentiometer 18 associated with the throttle valve;

I is the upper limit curve;

II is the lower limit curve;

a1 is the maximum deviation in linearity of the potentiometer 13;

a2 is the maximum deviation in linearity of the potentiometer 18;

dx1 is the voltage shift of the potentiometer 13;

dx2 is the voltage shift of the potentiometer 18.

Both potentiometers 13 and 18 are adjusted by balancing two points each on the same slope (points 1, 2). The adjustment can be effected both mechanically by laser trimming or else by mathematical compensation in a microprocessor which is part of the electronic system 3.

For rough orientation, the absolute values of the wiper voltages of the two potentiometers are compared with each other. In this way, a lifting of the setting element 5 on the throttle-valve side away from the setting element 11 on the setting-drive side, however, can only be dependably recognized when the difference between the two wiper voltages is greater than the sum of the two maximum possible deviations a1 and a2 from the ideal straight lines determined by points 1 and 2.

The evaluation via the gradients of the two wiper voltage courses is substantially more precise. If, for instance, the wiper of the potentiometer 18 experiences a specific voltage shift dx2, a voltage shift dx1 can at most occur on the wiper of the potentiometer 13 as a result of the microlinearilty properties of the two potentiometers.

This method of evaluation will be explained in further detail with reference to FIG. 4.

In the throttle valve position $11_{min}$, the potentiometers 13 and 18, due to different offsets, have different voltage drops which are the starting point for the further consideration.

Figure 4:
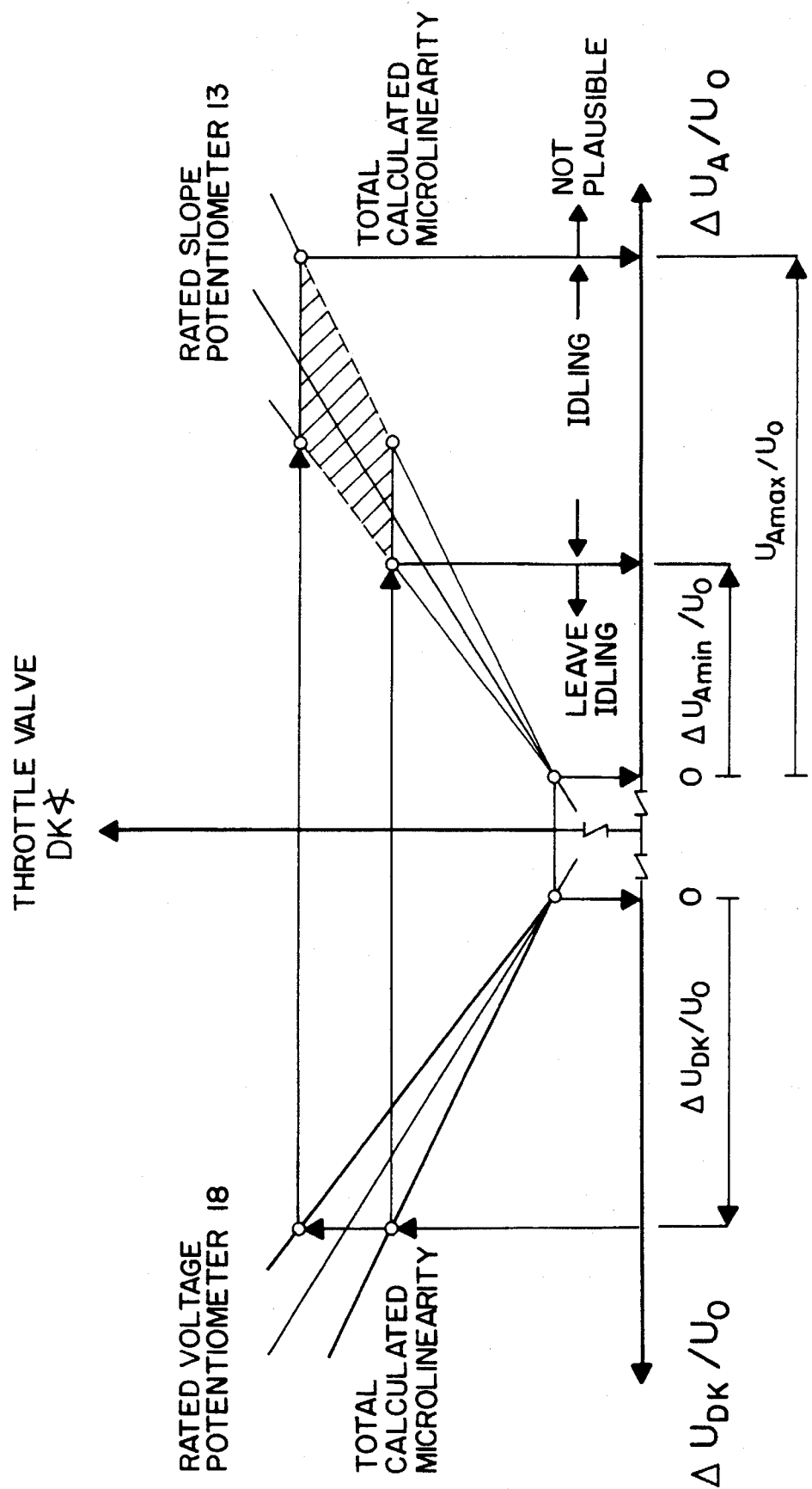
FIG. 4 shows, for the second aspect, the explanation of the microlinearity properties.

The microprocessor of the electronic system 3 calculates for both potentiometers 13 and 18, with the aid of the microlinearities of the two potentiometers stored in its non-linear storage, the tolerance regions which are shown in FIG. 4 as envelope lines of the straight lines designated rated slope.

If, now, a voltage shift $\Delta U_{DK}$ is produced on the potentiometer 18 on the throttle-valve side, the microprocessor, on basis of the known tolerance region microlinearity, determines the possible voltage range of the throttle valve potentiometer 18. A given angular region of the throttle valve position can be associated with this possible voltage range. Starting from this angular range, it is concluded that there is a voltage range $\Delta U_A$ of the potentiometer 13 on the drive side. If the voltage range $\Delta U_A$ of the potentiometer 13 on the drive side is within this voltage range, the electronics concludes that there is idling.

We claim:

1. A method for recognition of idling in connection with a load-shifting device of an internal combustion engine, wherein the engine is controlled by a throttle valve in response to a pedal and an electronic control system, the load-shifting device includes a first setting element on the throttle-valve side connected to the pedal and a first potentiometer, and a second potentiometer with a second setting element on the setting-drive side of an electromotive setting drive, the position of the setting element on the throttle-valve side is monitored by the first potentiometer, and the position of the setting element on the setting-drive side is monitored by the second potentiometer; the method comprising steps of:

providing for the first and the second potentiometers linear characteristic curves;

establishing a fixed predetermined ratio between the characteristic curves;

detecting an actual ratio of the characteristic curves resulting from operating of the engine; and comparing the actual characteristic curve-ratio with the predetermined characteristic curve ratio for agreement, and, in the event of agreement between the actual ratio and the predetermined ratio of the characteristic curves, producing an idling signal and, in case an idling signal is already present, allowing the electromotive setting drive to be controlled by the electronic system.

2. A method according to claim 1, wherein, in said establishing and said detecting steps for the determination of the ratio of the characteristic curves, their differences in slope and offset are determined.

3. A method according to claim 1, wherein in said establishing and detecting steps, the ratio between the two characteristic curves is determined with the pedal unactuated, the pedal being an accelerator pedal, and said second setting element is drivable by an electric motor of the load-shifting device to be positioned in $LL_{min}$ and $LL_{max}$ positions; and the method comprises a further step of storing limit values ($A_{min}$, $DK_{min}$; $A_{max}$, $DK_{max}$) of the characteristic curves determined in these positions in a nonvolatile storage of the electronic system.

4. A method according to claim 3, wherein said establishing step takes place at the end of the manufacture of a vehicle having the engine and the load-shifting device.

5. A method according to claim 3, wherein said detecting step is repeated upon each start of a vehicle having the engine and the load-shifting device, and wherein, in said storing step, the stored limit values ($A_{min}$, $DK_{min}$; $A_{max}$, $DK_{max}$) are corrected in the event of deviations.

6. A method for recognition of idling in connection with a load-shifting device of an internal combustion engine, wherein the engine is controlled by a throttle valve in response to a pedal and an electronic control system, the load shifting-device includes a first setting element on the throttle-valve side connected to the pedal and a first potentiometer, and a second potentiometer with a second setting element on a setting-drive side, the position of the setting element on the throttle valve side is monitored by the first potentiometer, and the position of the setting element on the setting-drive side is monitored by the second potentiometer; the method comprising steps of:

setting said first and said second potentiometers at two points each at a common slope;

detecting voltage shifts of said first and said second potentiometers upon a change in throttle valve position; and recognizing idling if, with a given voltage shift of said first potentiometer connecting with said pedal, a voltage shift determined on basis of the microlinearity properties of the potentiometers is preset on said second potentiometer.

7. A method according to claim 6, wherein, before the detecting of the voltage shifts occurring on said potentiometers, there is a step of comparing the absolute values of the wiper voltages of said first and said second potentiometers with each other to determine whether the difference between the two wiper voltages is greater than the sum of two maximum possible deviations of the potentiometer wiper voltages from ideal straight lines determined by balancing points.

* * * * *